(12) United States Patent
Yuan et al.

(10) Patent No.: US 10,554,600 B2
(45) Date of Patent: Feb. 4, 2020

(54) METHOD AND DEVICE FOR SENDING EMOTICONS

(71) Applicant: Tencent Technology (Shenzhen) Company Limited, Shenzhen (CN)

(72) Inventors: Mengyi Yuan, Shenzhen (CN); Liang Wu, Shenzhen (CN); Yongyu Lin, Shenzhen (CN); Zhenjie Gong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 800 days.

(21) Appl. No.: 15/170,422

(22) Filed: Jun. 1, 2016

(65) Prior Publication Data

US 2016/0277333 A1    Sep. 22, 2016

Related U.S. Application Data

(63) Continuation of application No. PCT/CN2015/071451, filed on Jan. 23, 2015.

(30) Foreign Application Priority Data

Mar. 17, 2014  (CN) .......................... 2014 1 0098648

(51) Int. Cl.
*H04L 12/58* (2006.01)
*H04L 29/06* (2006.01)
*H04L 29/08* (2006.01)

(52) U.S. Cl.
CPC .............. *H04L 51/08* (2013.01); *H04L 51/04* (2013.01); *H04L 67/06* (2013.01); *H04L 67/42* (2013.01)

(58) Field of Classification Search
CPC ......... H04L 51/08; H04L 51/04; H04L 67/06; H04L 67/42
See application file for complete search history.

(56) References Cited

U.S. PATENT DOCUMENTS 6,990,452 B1 * 1/2006 Ostermann ............. G10L 13/00
                                                          345/473
7,203,648 B1   4/2007 Ostermann et al.
(Continued)

FOREIGN PATENT DOCUMENTS

CN        101047923 A    10/2007
CN        101494618 A     7/2009
(Continued)

OTHER PUBLICATIONS

Office Action dated Jul. 24, 2017 for Chinese Application No. 201410098648.7, 7 pages.
(Continued)

*Primary Examiner* — Patrice L Winder
(74) *Attorney, Agent, or Firm* — Brinks Gilson & Lione

(57) ABSTRACT

A method for sending emoticons includes requesting, by a first client device, to download an emoticon pack including a plurality of emoticons; transmitting, by a processing unit, the emoticon pack to the first client device; displaying, by the first client device, a download complete page including a user interface; and sending, by the first client device, one of the plurality of emoticons, to a second client device, by using the user interface on the download complete page.

20 Claims, 7 Drawing Sheets

(56) References Cited

U.S. PATENT DOCUMENTS

| | | | | |
|---|---|---|---|---|
| 7,548,755 | B2* | 6/2009 | Kim | H04L 51/38 |
| | | | | 455/414.4 |
| 8,116,791 | B2* | 2/2012 | Agiv | G06F 17/214 |
| | | | | 455/466 |
| 8,255,810 | B2* | 8/2012 | Moore | H04M 1/72547 |
| | | | | 715/752 |
| 8,341,531 | B2* | 12/2012 | Czeisler | H04L 67/34 |
| | | | | 715/739 |
| 8,831,649 | B2* | 9/2014 | Lee | H04W 4/12 |
| | | | | 345/160 |
| 8,930,463 | B2* | 1/2015 | Bonforte | G06Q 10/107 |
| | | | | 709/201 |
| 9,152,219 | B2* | 10/2015 | Dai | H04L 51/08 |
| 2006/0009243 | A1* | 1/2006 | Dahan | H04L 51/04 |
| | | | | 455/466 |
| 2009/0124268 | A1* | 5/2009 | McNamara | G06Q 10/107 |
| | | | | 455/466 |
| 2012/0042076 | A1* | 2/2012 | Kawa | G06F 9/50 |
| | | | | 709/226 |
| 2015/0334067 | A1* | 11/2015 | Zonka | H04L 67/36 |
| | | | | 715/752 |

FOREIGN PATENT DOCUMENTS

| | | |
|---|---|---|
| CN | 101557354 A | 10/2009 |
| CN | 102236676 A | 11/2011 |
| CN | 102236676 A | 11/2011 |
| CN | 102420782 A | 4/2012 |

OTHER PUBLICATIONS

ISR and Written Opinion to PCT/CN2014/071451, dated Apr. 24, 2015, (13p).

* cited by examiner

METHOD AND DEVICE FOR SENDING EMOTICONS

This application is a continuation out of PCT Application No. PCT/CN2015/071451, filed on Jan. 23, 2015, which claims priority to Chinese Patent Application No. 201410098648.7, filed on Mar. 17, 2014, both of which are hereby incorporated by reference in their entirety.

FIELD OF THE DISCLOSURE

The present disclosure generally relates to internet communication technology, more particularly to a method and a device for sending emoticons.

BACKGROUND OF THE DISCLOSURE

The statements in this section merely provide background information related to the present disclosure and may not constitute prior art.

Social network applications having instant messaging function have been widely in use. Remote users can communicate with one another through instant messaging over the web in real time. The users often send emoticons together with text-based messages to make the instant messaging more interesting.

A typical method of sending an emoticon generally requires several steps. To send an emoticon that is not included in any of the default emoticon packs installed in the user's device, a user needs to go to an emoticon library homepage that includes a list of emoticon packs and download a desired emoticon pack to the user's device. When the download is completed, the user needs to return to a contact list page, select a contact from the contact list, and obtain a chat window. After the chat window is displayed, the user needs to click an emoticon display icon to open an emoticon display area, selects the downloaded emoticon pack to display the plurality of emoticons in the emoticon display area, and selects and sends one of the plurality of emoticons to the contact. The typical method requires several steps and significant time from downloading the emoticon pack to the user' device to sending the emoticon to a contact.

SUMMARY OF THE DISCLOSURE

The present disclosure provides a method and a device for quickly sending emoticons. The method includes fewer steps than a typical method to save the user's time sending emoticons.

In one form, a method of sending emoticons according to the present disclosure includes: requesting, by a first client device, to download an emoticon pack including a plurality of emoticons; transmitting, by a processing unit, the emoticon pack to the first client device; displaying, by the first client device, a download complete page including a user interface; and sending, by the first client device, one of the plurality of emoticons, to a second client device, by using the user interface on the download complete page.

In another form, a device for sending emoticons according to the present disclosure includes: a downloading module, configured to download an emoticon pack including at least one emoticon from a download start page; an obtaining module, configured to, after said emoticon pack has been downloaded and when an instruction triggered by clicking on the send button in the download complete page is detected, obtaining the chat window corresponding to a contact depending on said instruction; a displaying module, configured to display said at least one emoticon included in the emoticon package on an emoticon display area of said chat window; and a sending module, configured to obtain the emoticon which is selected from the emoticon display area of said chat window by user and sending to said contact.

Further aspects of the present disclosure will be in part apparent and in part pointed out below. It should be understood that various aspects of the disclosure may be implemented individually or in combination with one another. It should also be understood that the detailed description and drawings, while indicating certain exemplary forms of the present disclosure, are intended for purposes of illustration only and should not be construed as limiting the scope of the disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF ILLUSTRATED EMBODIMENTS

The following description is merely exemplary in nature and is not intended to limit the present disclosure or the disclosure's applications or uses.

Any of the embodiments contained herein is described in connection with a first client device (a user's client device), a second client device (a contact's client device), and a processing unit. The first and second client devices may be installed with an instant messaging application, including but not limited to, WeChat, LINE, Instagram, WhatsApp, Google+, Google Talk, Yahoo Messenger, Skype, etc. It is understood that the methods of the present disclosure can be implemented in any Internet communication applications that supports instant messaging function. The first and second client devices may be any mobile devices, such as smart phones, tablets, or PCs that can be connected to the Internet. The processing unit may be a backend server of the instant messaging application.

First Embodiment

Figure 1:
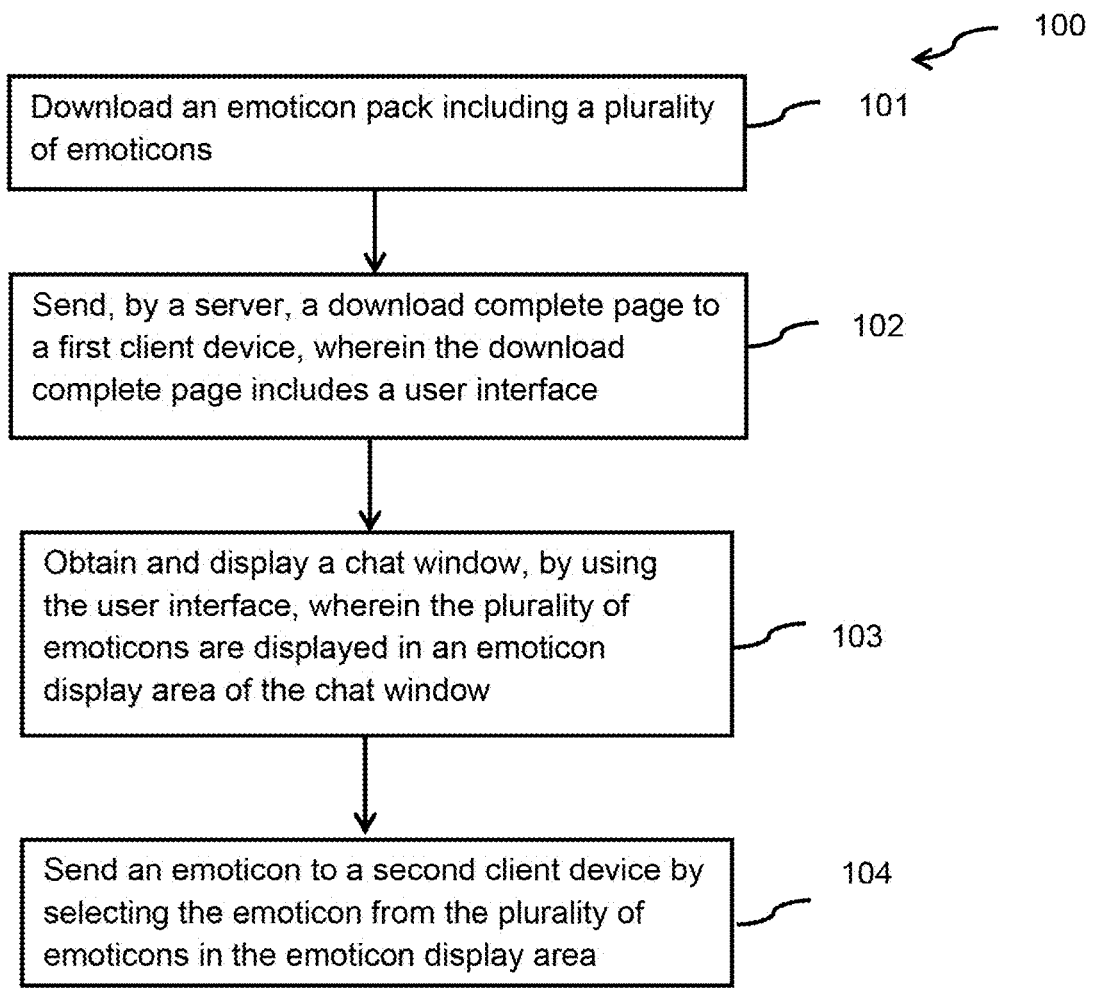
FIG. 1 is a flowchart of a method for sending emoticons according to a first embodiment of the present disclosure.

As shown in FIG. 1, a first embodiment of the present disclosure provides a method for sending emoticons starts with step 101 of downloading, by a first client device, an emoticon pack including a plurality of emoticons. To download an emoticon pack, a user logins an instant messaging application installed on the first client device and goes to an emoticon library homepage. The backend server sends an emoticon library homepage to the first client device, which, in turn, displays the emoticon library homepage. The emoticon library homepage displays a plurality of emoticon pack identification symbols corresponding to a plurality of emoticon packs. The plurality of emoticon packs each includes one or more emoticons. By clicking on one of the emoticon pack identification symbols, the first client device sends an emoticon display request to the processing unit to display an emoticon pack corresponding to the selected emoticon pack identification symbol. The server, in response, sends a download start page to the first client device, which displays the one or more emoticons in the selected emoticon pack. The download start page also includes a download interface, which may be in the form of a download button. When the user clicks the download button, the first client device receives the download instructions from the user and sends a download request to the processing unit, which, in response, sends the plurality of emoticons in the selected emoticon pack to the first client device.

When download is completed, the processing unit sends a download complete page to the first client device in step 102. The first client device then displays the download complete page. The download complete page displays the plurality of the emoticons being downloaded and a user interface. The plurality of emoticons may be displayed, for example, in the form of thumbnail images. The user interface may be in the form of a send button.

Next, by using the user interface, such as by clicking on the send button, the first client device sends a request to the processing unit, to obtain a chat window and display the plurality of emoticons in the chat window. In response, the processing unit sends a chat window corresponding to a contact on the first client device. The first client device displays a chat window, which includes a chat display area, a chat input box and an emoticon display area. The one or more emoticons in the downloaded emoticon pack are displayed in the emoticon display area. This step may optionally include a sub-step of obtaining, by the first client device, a contact list from the processing unit to select a contact from the contact list. By clicking on a contact from the contact list, the chat window corresponding to the contact is obtained and displayed on the first client device. When the chat window is opened and displayed, the one or more emoticons of the downloaded emoticon pack are also displayed in the emoticon display area. Therefore, the user can click on one of the emoticons displayed in the emoticon display area so that the first client device sends the selected emoticon to the contact in step 104. The selected emoticon is then displayed in a chat display area of the chat window at both the first and second client devices, indicating that the selected emoticon has been sent to the contact.

Second embodiment

Figure 2:
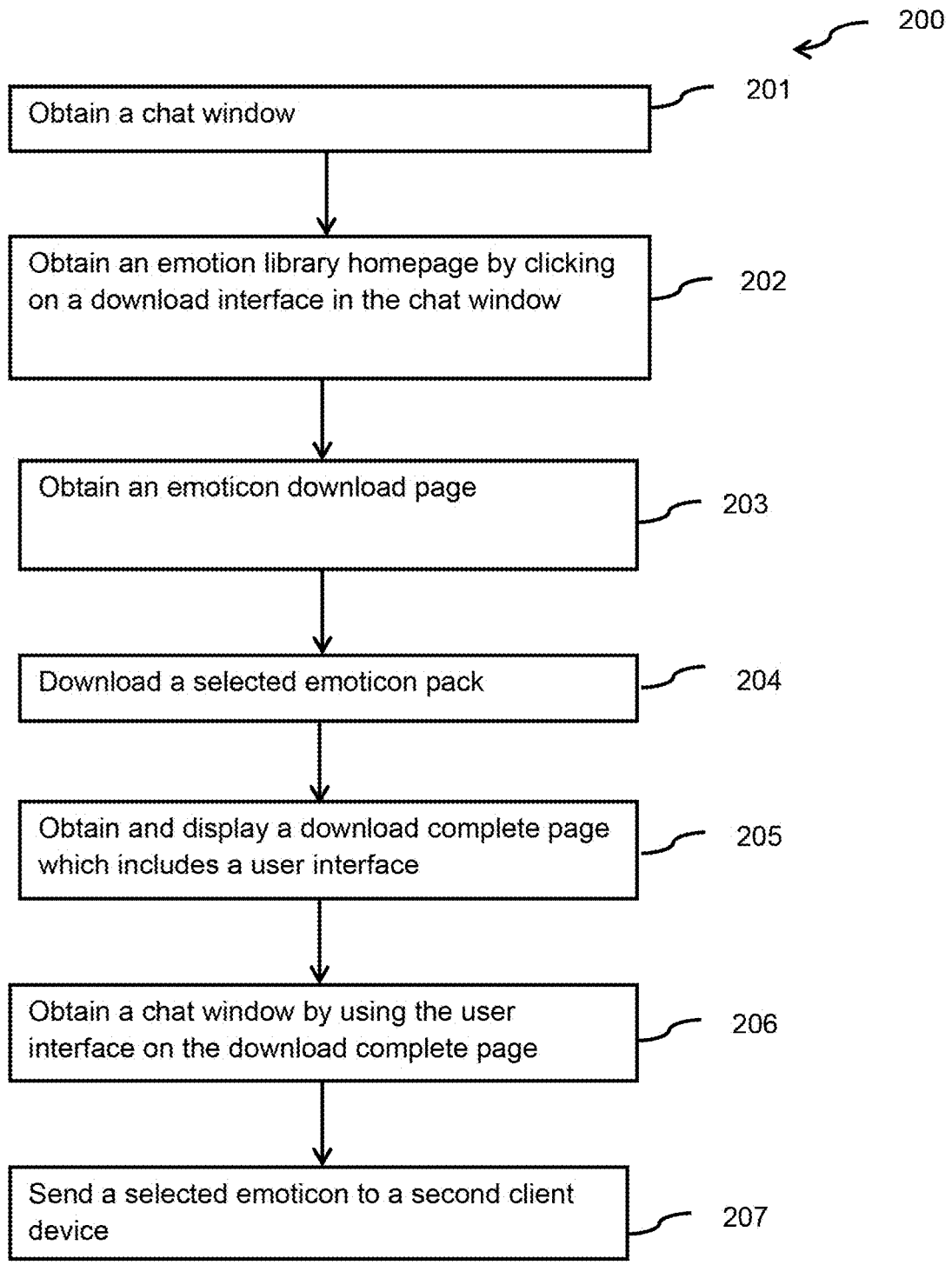
FIG. 2 is a flowchart of a method for sending emoticons according to a second embodiment of the present disclosure.

As shown in FIG. 2, a method 200 for sending emoticons according to a second embodiment of the disclosure is now described. In the present embodiment, the step of downloading a desired emoticon pack starts with obtaining a chat window. The user first logins the instant messaging application and obtains a chat window in step 201. In this step, the user may first open a contact list and select a contact. By clicking on the selected contact, the first client device obtains and displays a chat window corresponding to the selected contact. The chat window includes a download interface in the chat window.

Figure 3:
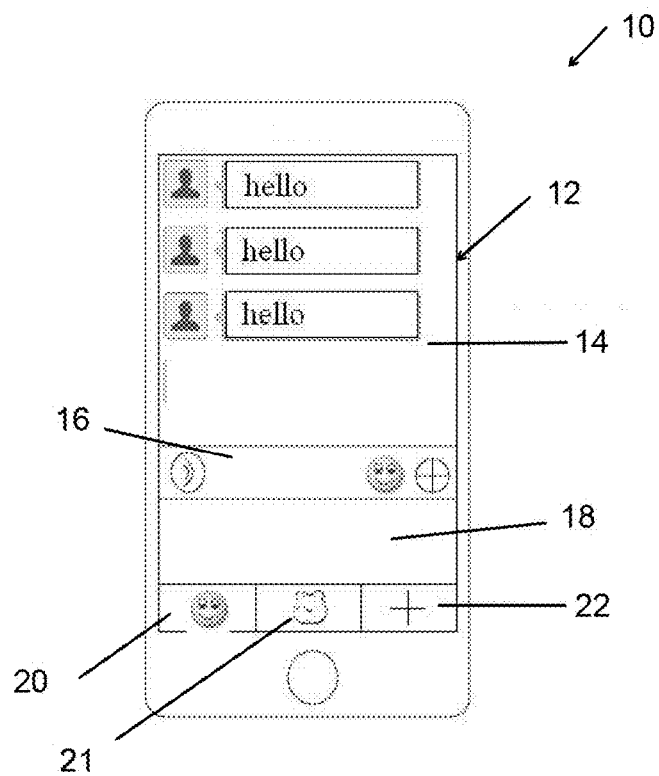
FIG. 3 is a schematic view of a chat window displayed at the first client device.

As shown in FIG. 3, an exemplary chat window 12 displayed at the first client device 10 includes a chat display area 14, a chat input box 16, an emoticon display area 18, an emoticon pack identification symbols/icons 20, 21 and a download interface 22. The download interface 22 may be in the form of a download button and shown by a "+" sign. It is understood that any symbol may be used to indicate the download interface 22.

Referring back to FIG. 2, next, the first client device 10 obtains an emoticon library homepage by using the download interface 22, such as by clicking the download button, in step 202. By using the download interface 22, the client device 10 sends an emoticon library homepage request to the processing unit. In response, the processing unit sends the emoticon library homepage to the first client device, which in turn, displays the emoticon library homepage on the first client device 10.

Figure 4:
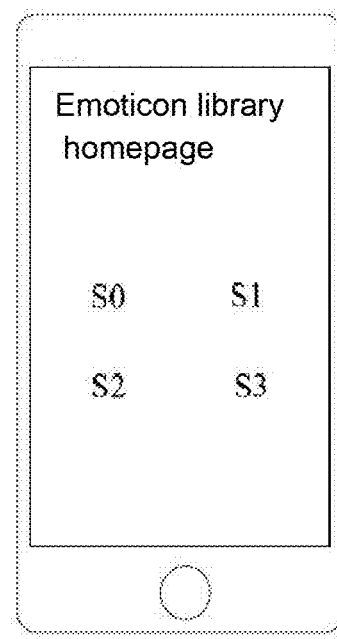
FIG. 4 is a schematic view of an emoticon library homepage.

As shown in FIG. 4, an exemplary emoticon library homepage is shown to display a plurality of emoticon pack identification icons S0, S1, S2, S3 that correspond to a plurality of emoticon packs. Each emoticon pack includes one or more emoticons.

Figure 5:
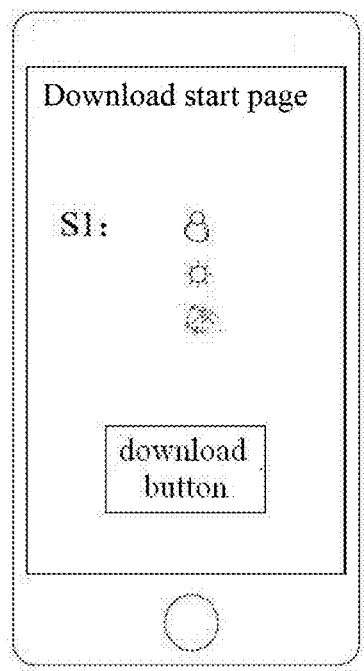
FIG. 5 is a schematic view of a download start page.

Referring back to FIG. 2, the user selects a desired emoticon pack on the emoticon library homepage by clicking on one of the plurality of emoticon pack identification symbols S0, S1, S2, S3 to obtain an emoticon download page in step 203. For example, when the user clicks the emoticon pack identification symbol S1, the first client device 10 sends an emoticon download request to the server, which, in response, sends a download start page to the first client device 10. The first client device 10 displays the download start page. An exemplary download start page is shown in FIG. 5, where the download start page displays one or more emoticons contained in the selected emoticon pack S1. The one or more emoticons may be displayed in the form of thumbnail images. The download start page includes a download button.

Referring back to FIG. 2, the first client device 10 starts to download the emoticon pack S1 to the first client device when the user clicks the download button on the download start page in step 204. By clicking the download button, the first client device sends a download confirmation request to the processing unit. In response, the processing unit sends the requested emoticon pack to the first client device 10. The first client device 10 then stores the downloaded emoticon pack locally in its memory and adds an identification symbol/icon and menu for the downloaded emoticon pack to the emoticon menu.

Figure 6:
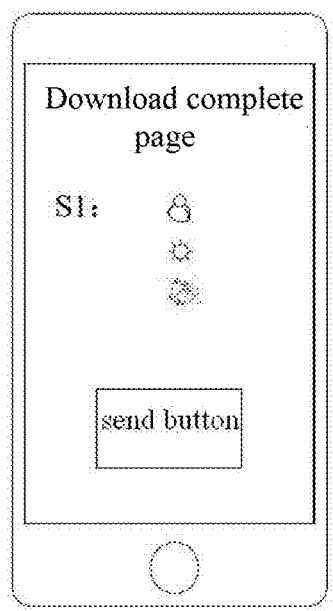
FIG. 6 is a schematic view of a download complete page.

Once download is completed, the first client device 10 obtains and displays a download complete page in step 205. An exemplary download complete page is shown in FIG. 6 to display one or more emoticons contained in the selected emoticon pack S1 and a "send" button. The download complete page may look similar to the download start page, differing in that the download start page includes a download button, whereas the download complete page includes a send button. It is understood that any user interface may be used to replace the "download" button on the download start page and the "send" button on the download complete page.

Figure 7:
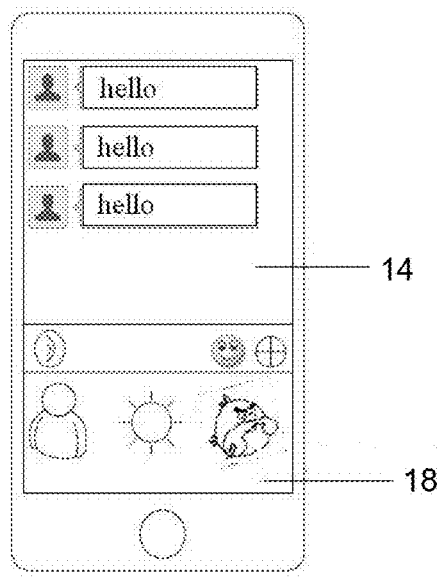
FIG. 7 is a schematic view of an updated chat window displayed at the first client device.
Figure 8:
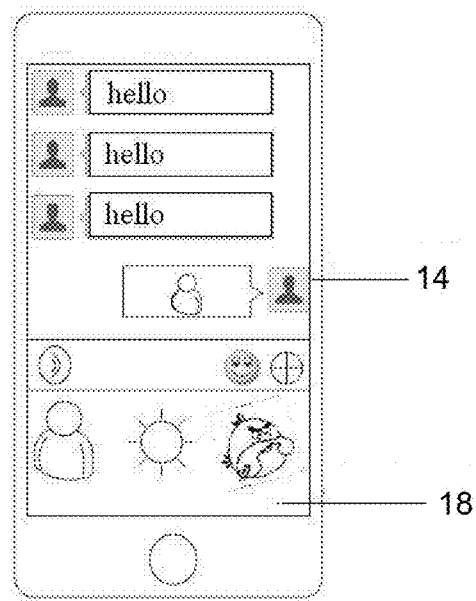
FIG. 8 is a schematic view of another updated chat window displayed at the first client device.

Next, the first client device 10 obtains a chat window corresponding to a contact when the user uses the user interface, e.g., the "send" button, on the download complete page in step 206. When the user clicks the "send" button on the download complete page, the first client device may send a contact list request to the processing unit, which in turn, sends back a contact list to the first client device. The user then selects a contact from the contact list to open and obtain a chat window. When the chat window is opened and displayed on the first client device, the emoticons in the downloaded emoticon pack are also displayed in the emoticon display area as shown in FIG. 7.

Finally, the user selects an emoticon from the emoticon display area of the chat window and thus the first client device sends the selected emoticon to the second client device of the contact in step 207. By selecting an emoticon from the emoticon display area, the first client device sends a request to the processing unit to send the selected emoticon to the second client device of the contact. In response, the processing unit then sends the selected emoticon to the second client device. The selected emoticon is then displayed in a chat area of a chat window displayed at both the first and second client devices, indicating that the selected emoticon has been sent from the first client device to the second client device.

Third Embodiment

Figure 9:
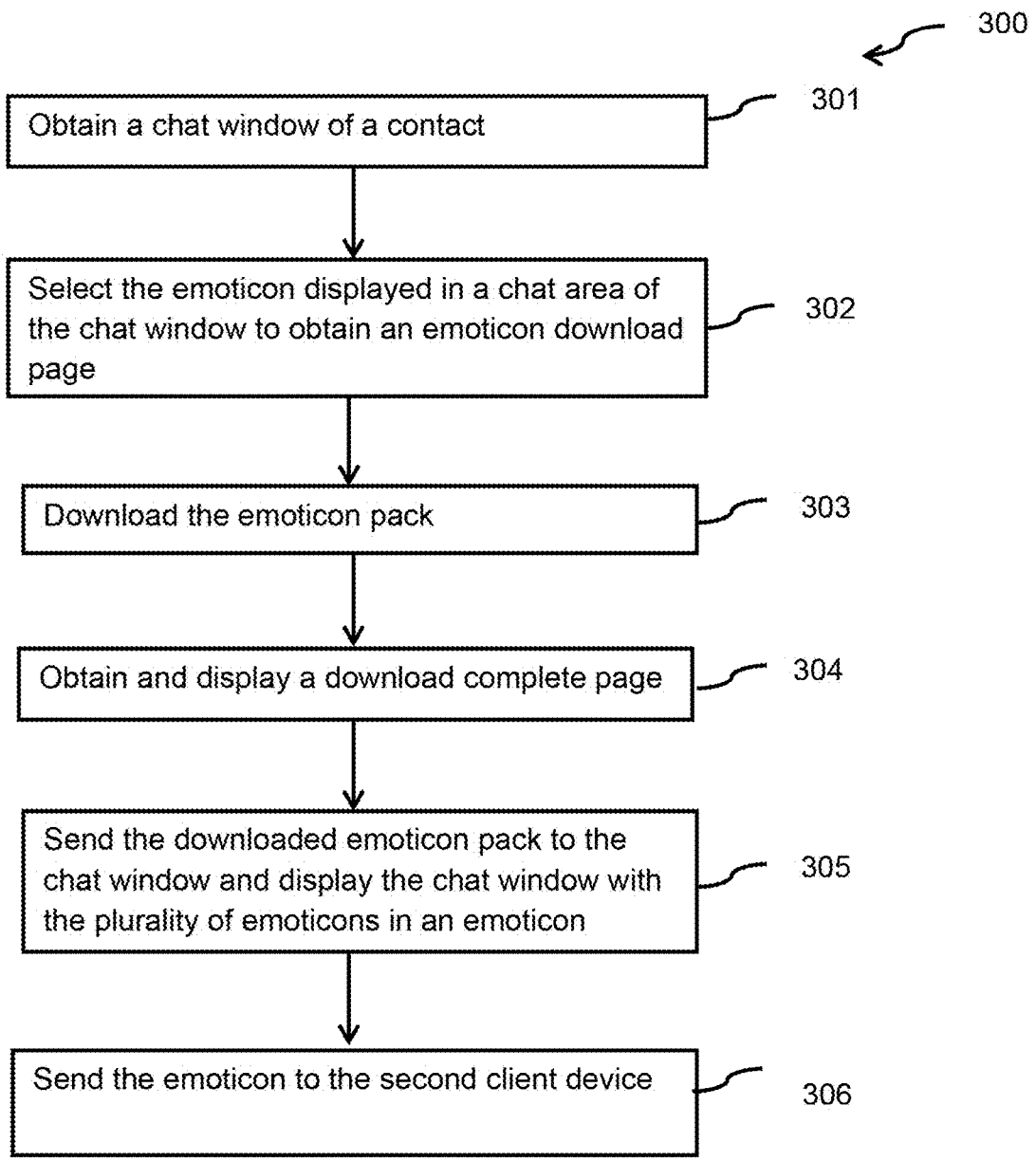
FIG. 9 is a flowchart of a method for sending emoticons according to a third embodiment of the present disclosure.

Referring to FIG. 9, a method 300 for sending emoticons according to a third embodiment of the present disclosure is similar to method 200 of the second embodiment, differing in the steps before the display of the download start page and after the display of the download complete page. Therefore, detailed description of steps in method 300 in connection with the downloading operation will be omitted herein for clarity.

In the present embodiment, the first client device obtains a chat window corresponding to a contact in step 301. The chat window may have displayed in the chat area 14 a particular emoticon, which is sent from the second client device to the first client device. To download the particular emoticon pack that includes the particular emoticon to the first client device, the user may tap on the particular emoticon to obtain and display a download start page on the first client device in step 302. The download start page includes the particular emoticon, along with other emoticons contained in the particular emoticon pack, and a download button. The download start page may look similar to that shown in FIG. 5. The user then clicks on the download button to download the particular emoticon pack that includes the particular emoticon and other emoticons in step 303. When the download is completed, the first client device displays a download complete page including a send button in step 304. The download complete page may look similar to that of FIG. 6. The user then clicks the send button to open the chat window corresponding to the contact and send the downloaded emoticon pack to the chat window in step 305. The first client device then displays an updated contact window corresponding to the contact wherein one or more emoticons contained in the particular emoticon pack are also displayed in the emoticon display area of the updated contact window. The user then selects an emoticon from the emoticon display area and sends the emoticon to the client in step 306. The selected emoticon is then displayed in a chat display area of a chat window on both the first and second client devices, indicating that the selected emoticon has been sent from the first client device to the second client device.

In the present embodiment, the user does not need to go to the emoticon library homepage after the user taps on the particular emoticon. This is because, by taping the emoticon displayed on the chat display area, it is presumed that the user is interested in the particular emoticon pack that contains the particular emoticon. If the user is interested in other emoticon packs, the user has the options to use the download button located adjacent to the emoticon display area, which would direct the user to an emoticon library homepage, as previously described in step 202 and shown in FIG. 3 of the second embodiment. Therefore, there is no need to direct the user to the emoticon library homepage.

Moreover, in the present embodiment, the first client device displays an updated chat window corresponding to the contact right after the user clicks the send button on the download complete page. There is no need to display a contact list page to prompt the user to select a contact. It is presumed that the user is chatting with the contact when the user receives and downloads the particular emoticon pack that includes the particular emoticon. It is also presumed that the user wishes to continue to chat with the contact after the particular emoticon pack is downloaded. There is no need for the first client device to display the contact list to prompt the user to select a contact. Therefore, the steps for sending emoticons can be further simplified. However, it is understood that, in one variant of the present embodiment, the step of displaying a contact list page may still be included. For example, the download complete page may give the user options, e.g., in the form of two user interfaces, to obtain a contact list or to directly open and obtain a chat window that includes the most recent chat.

In another variant of the third embodiment, the method may include most of the steps previously described except for the download complete page. In this variant, the download complete page may display a plurality of emoticons each being configured to provide a user interface. The download complete page also includes a send button. The user may first select one of the plurality of emoticons by clicking on the selected emoticon and then click on the send button. The first client device then sends a request, along with the selected emoticon, to the processing unit. In response, the processing unit sends the selected emoticon to the second client device. The emoticon is then displayed in the chat display area of the chat window at both the first and second client devices, indicating that the selected emoticon has been sent from the first client device to the second client device. In other words, the step of selecting an emoticon from the emoticon display area of a chat window is eliminated. The emoticon is directly sent to the contact after the user selects an emoticon on the download complete page and after the user clicks the send button on the download complete page. Therefore, this variant can further reduce the time for sending the emoticon to the contact.

Fourth Embodiment

Figure 10:
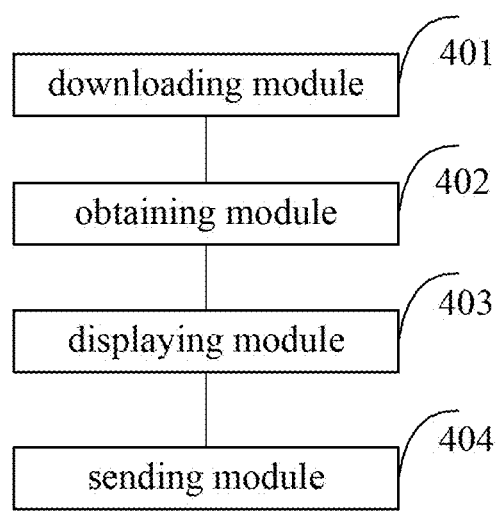
FIG. 10 is a schematic diagram of a device for sending emoticons according to a fourth embodiment of the present disclosure.

As shown in FIG. 10, a device for sending emoticons according to a forth embodiment of the present disclosure, comprising: a downloading module 401, configured to download an emoticon pack including at least one emoticon from a download start page; an obtaining module 402, configured to obtain a chat window corresponding to a contact, after the emoticon pack has been downloaded and when an instruction triggered by clicking on the send button on the download complete page is detected; a displaying module 403, configured to display the at least one emoticon included in the emoticon pack in an emoticon display area of the chat window; a sending module 404, configured to obtain and send the selected emoticon to the contact.

The obtaining module 402 includes: a first obtaining unit, configured to obtain a contact list or a recent contact list to allow the user to select a contact from the contact list or the recent contact list; a second obtaining unit, configured to obtain the chat window corresponding to the selected contact. The downloading module 401 includes: a third obtaining unit, configured to, when a download request instruction triggered by clicking on the download interface of current open chat window is detected, obtain and display an emoticon library homepage according to said download request instruction; wherein, said emoticon library homepage includes at least one emoticon pack identification symbol/icon, so that the user can select an emoticon pack identification icon to download a desired emoticon pack; a creating and displaying unit, configured to create and display the download start page corresponding to the selected emoticon pack, wherein said download start page includes a download button and at least some emoticons in said emoticon pack; a downloading unit, configured to, when a download instruction triggered by clicking on said download button is detected, download the emoticon pack according to said download instruction.

Further, the downloading module 401 is also configured to obtain and save the corresponding contact of current open chat window. The obtaining module 402 is also configured to obtain the saved contact according to the instruction, and to open the corresponding chat window of said saved contact. The downloading unit is also configured to update the download button in the download start page with a send button after downloading said emoticon pack. As such, the download complete page incudes the downloaded emoticons and a send button can be displayed.

In any of the embodiments described in the present application, after an emoticon pack is downloaded, a user interface, e.g., in the form of a send button, is provided on the download complete page. The user can click on the send button to open and obtain a contact list or directly open and obtain a chat window immediately after the user clicks on the send button. The downloaded emoticons are displayed in the emoticon display area of the chat window when the chat window is opened and displayed at the first client device. Therefore, the user can select an emoticon from the emoticon display window and send the emoticon to the second client device. By providing the send button on the download complete page and by displaying the downloaded emoticons in the emoticon display area as soon as the chat window is opened and displayed, the user can more quickly send a selected emoticon to a contact, thereby saving the user's time. Optionally, the download complete page can be further configured to provide user interfaces for downloaded emoticons. By selecting an emoticon on the download complete page and by clicking on the send button, the selected emoticon can be directly sent to a contact (more particularly, the second contact device), thereby eliminating the need to obtain a chat window before the emoticon can be sent to the contact, and further saving time for sending the emoticons. Any embodiment of the present application has the advantages of reducing the time for sending a selected emoticon to a contact.

Through the above description of the embodiments, technical personnel of the field can clearly understand that the above method can use software and necessary general hardware platform to implement. Therefore, the essence of technical scheme of the disclosure or the contributing part to existing technology can be embodied in form of a software product. Said software product is stored in a storage medium (such as ROM/RAM, disk, CD-ROM). Said storage medium can be a terminal (such as mobile, computer, server, or network device) implementing the described method of present disclosure.

It should be noted that the disclosure is not limited to the embodiments described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present application.

The invention claimed is:

1. A method for sending emoticons in a chat application by a first client device, comprising:
  displaying a chat interface of the chat application;
  receiving a message from a second client device containing an emoticon and displaying the message in the chat interface; and
  upon determining that the emoticon displayed in the chat interface is clicked by a user of the first client device:
    requesting, from an emoticon server, to download an emoticon pack of a plurality of emoticons including the emoticon and other emoticons associated with the emoticon;
    receiving the emoticon pack from the emoticon server, and;
    incorporating the emoticon pack with the chat application for sending messages with emoticons from the emoticon pack.

2. The method according to claim 1, after receiving the emoticon pack, further comprising switching to a download complete interface having a first button.

3. The method according to claim 2, wherein the download complete interface further comprises a set of emoticons from the emoticon pack.

4. The method according to claim 2, further comprising switching back to the chat interface right after the user activates the first button in the download complete interface.

5. The method according to claim 4, further comprising displaying the plurality of emoticons of the emoticon pack in an emoticon display area of the chat interface.

6. The method according to claim 5, further comprising, upon selecting, by the user, an emoticon from the plurality of emoticons displayed in the emoticon display area, sending the selected emoticon to the second client device.

7. The method according to claim 3, further comprising receiving a selection of one of the set of emoticons on the download complete interface.

8. The method according to claim 7, further comprising sending the selected one of the set of emoticons to the second client device and thereafter switching back to the chat interface.

9. The method according to claim 8, wherein the chat interface displays the selected emoticon in a chat display area of the chat interface.

10. The method according to claim 2, further comprising displaying a contact list when the user activates the first button.

11. The method according to claim 10, further comprising obtaining anther chat interface after receiving a user selection of a contact from the contact list, wherein the another chat interface displays the plurality of emoticons in an emoticon display area.

12. A terminal device comprising a memory and a processor, wherein the processor, when executing instructions form the memory, is configured to cause the terminal device to:
  displaying a chat interface of the chat application;
  receiving a message from a second client device containing an emoticon and displaying the message in the chat interface; and
  upon determining that the emoticon displayed in the chat interface is clicked by a user of the first client device:

requesting, from an emoticon server, to download an emoticon pack of a plurality of emoticons including the emoticon and other emoticons associated with the emoticon;

receiving the emoticon pack from the emoticon server, and;

incorporating the emoticon pack with the chat application for sending messages with emoticons from the emoticon pack.

13. The terminal device of claim 12, wherein the processor, after causing the terminal device to receive the emoticon pack, is further configured to switching to a download complete interface having a first button.

14. The terminal device of claim 13, wherein the download complete interface further comprises a set of emoticons from the emoticon pack.

15. The terminal device of claim 13, wherein the processor is further configured to cause the terminal device to switch back to the chat interface right after the user activates the first button in the download complete interface.

16. The terminal device of claim 15, wherein the processor is further configured to cause the terminal device to display the plurality of emoticons of the emoticon pack in an emoticon display area of the chat interface.

17. The terminal device of claim 16, wherein the processor, upon selecting by the user an emoticon from the plurality of emoticons displayed in the emoticon display area, is configured to cause the terminal device to send the selected emoticon to the second client device.

18. The terminal device of claim 14, wherein the processor is further configured to cause the terminal device to receive a selection of one of the set of emoticons on the download complete interface.

19. The terminal device of claim 18, wherein the processor is further configure to cause the terminal device to send the selected one of the set of emoticons to the second client device and thereafter switch back to the chat interface.

20. The terminal device of claim 19, wherein the chat interface displays the selected emoticon in a chat display area of the chat interface.

* * * * *